Patented Aug. 29, 1933

1,925,027

UNITED STATES PATENT OFFICE 1,925,027

RECOVERY OF SULPHUR FROM GAS PURIFYING MATERIALS

Hermann Bollmann and Wilhelm Engelmann, Hamburg, Germany

No Drawing. Application December 14, 1931, Serial No. 581,052, and in Germany March 4, 1931

5 Claims. (Cl. 23—227)

It has already been proposed to recover sulphur from sulphur-containing ores and other sulphur containing materials, more particularly from old gas purifying masses, by distillation with superheated steam. This process did not, however, lead to wholly satisfactory results. It takes a relatively long time and is besides accompanied by the liberation of considerable quantities of sulphuretted hydrogen, whereby the yield of purified sulphur is greatly reduced. The sulphur so produced is sometimes relatively dark and impure while the cooling water of the injection condenser employed assumes a black colour and retains the odour of ammonium sulphide or hydrogen sulphide.

We have now found that these difficulties can be overcome and that the sulphur may be readily recovered from gas purifying materials with the simultaneous regeneration of the latter in an economical manner, if the steam distillation is carried out at reduced air pressure i. e. under partial vacuum, with steam heated for example to 150 to 180° C.

In order to prevent that portion of the sulphur which is contained in the gas purifying mass in the form of ferrous sulphide from being acted on by the steam to form hydrogen sulphide during the distillation, and thus being lost as far as concerns the recovery of sulphur, and being apt to contaminate the latter, oxygen, for example in the form of air is passed through the gas purifying material to be treated during the distillation, in such quantity as is required to prevent formation of hydrogen sulphide.

As, however, during the distillation, constituents of tar precipitated simultaneously with the sulphur in the gas purifying materials, other impurities and odourous substances are evaporated, they contaminate the sulphur during its condensation. In order to avoid this and to obtain a pure sulphur free from odourous substances the process is carried out by subjecting the sulphur vapour carried over with the steam to a fractional cooling.

To this end warm water is caused to act on the mixture of steam and sulphur for the purpose of condensation of the sulphur at a temperature at which the sulphur is caused to be condensed exclusively in the form of flowers of sulphur, while the vapours of tar and odourous substances having a considerably lower boiling point than sulphur pass into a second condenser in which they are cooled so as to be condensed.

For the performance of the invention expanded steam for example heated up to 150 to 180° C. is conveyed through the gas purifying material to be desulphurized, under a vacuum of about 70 mm. The distillation commences when the temperature of the gas purifying material reaches about 70° C.; at the end of the distillation a temperature of about 110° C. is reached; the distillation may take about four hours. Simultaneously with the steam so much air is passed through the gas purifying mass that there is neither a conversion into hydrogen sulphide nor an oxidization to sulphurous acid.

The mixture of evaporated sulphur, steam and impurities, the temperature of which is between 70 to 110° C. is conveyed into an injection cooler and here brought into contact with water of a temperature of for example 47° C. This warm water is likewise vaporized by the heat of the steam mixture to be cooled whereby the vapours are cooled until pure sulphur is separated out, while the tarry materials are kept in the vaporous condition, the tar vapors being carried along with the steam and condensed in a separate cooler.

The gas purifying material treated by this method and freed from the sulphur is looser and more porous than fresh gas purifying material; it is highly effective for the desulphurization of illuminating gas.

We claim:—

1. A process for the recovery of sulphur from gas purifying materials with simultaneous regeneration of the latter, which process comprises subjecting the gas purifying material to a distillation with expanded superheated steam in vacuo.

2. A process for the recovery of sulphur from gas purifying materials with simultaneous regeneration of the latter, which comprises subjecting the gas purifying material to a distillation with expanded superheated steam under vacuum while also passing oxygen through the material.

3. A process for the recovery of sulphur from gas purifying materials with simultaneous regeneration of the latter, which comprises subjecting the gas purifying material to a distillation with expanded superheated steam under vacuum while simultaneously passing an oxygen-containing gas through the material.

4. A process for the recovery of sulphur from gas purifying materials with simultaneous regeneration of the latter, which comprises subjecting the gas purifying material to a distillation with expanded superheated steam under vacuum while simultaneously passing air through the material.

5. A process for the recovery of sulphur as in claim 3 in which the vacuum distillation is effected with expanded steam heated to 150 to 180° C. and with the admission of just so much oxygen as to prevent formation of hydrogen sulphide while preventing also the formation of sulphurous acid by oxidation.

HERMANN BOLLMANN.
WILHELM ENGELMANN.